United States Patent [19]

Trubiano

[11] Patent Number: 4,471,970
[45] Date of Patent: Sep. 18, 1984

[54] RESILIENTLY BIASED SEAT PANEL FOR A SEAT FRAME OF A PUSH-CART

[75] Inventor: Antoine Trubiano, Pointe aux Trembles, Canada

[73] Assignee: Cari-All Inc., Montreal East, Canada

[21] Appl. No.: 968,752

[22] Filed: Dec. 13, 1978

[51] Int. Cl.³ .............................................. B62B 11/00
[52] U.S. Cl. .............................................. 280/33.99 B
[58] Field of Search ............... 280/33.99 B, 33.99 A, 280/47.35, 33.99 H; 297/250, 332, 333, 6

[56] References Cited

U.S. PATENT DOCUMENTS 1,325,548 12/1919 Wiley .................................. 297/333
3,638,982 2/1972 Chapman et al. .................. 297/332

Primary Examiner—Joseph F. Peters, Jr.
Attorney, Agent, or Firm—Alan Swabey; Robert Mitchell; Guy J. Houle

[57] ABSTRACT

A resiliently biased seat panel for a seat frame associated with an end gate of a push-cart. The end gate has leg holes to permit the legs of a child seated on the seat frame to extend therethrough. The seat panel comprises a hinge along an edge thereof to hingedly retain the panel for displacement to and away from the seat frame. A spring biases the seat panel away from the seat frame in a position against the leg holes to obstruct at least a substantial portion of the leg holes when the seat panel is not utilized for seating a child. Thus, articles positioned on the seat frame cannot fall through the leg holes as it is obstructed by the seat panel.

4 Claims, 4 Drawing Figures

U.S. Patent  Sep. 18, 1984  4,471,970
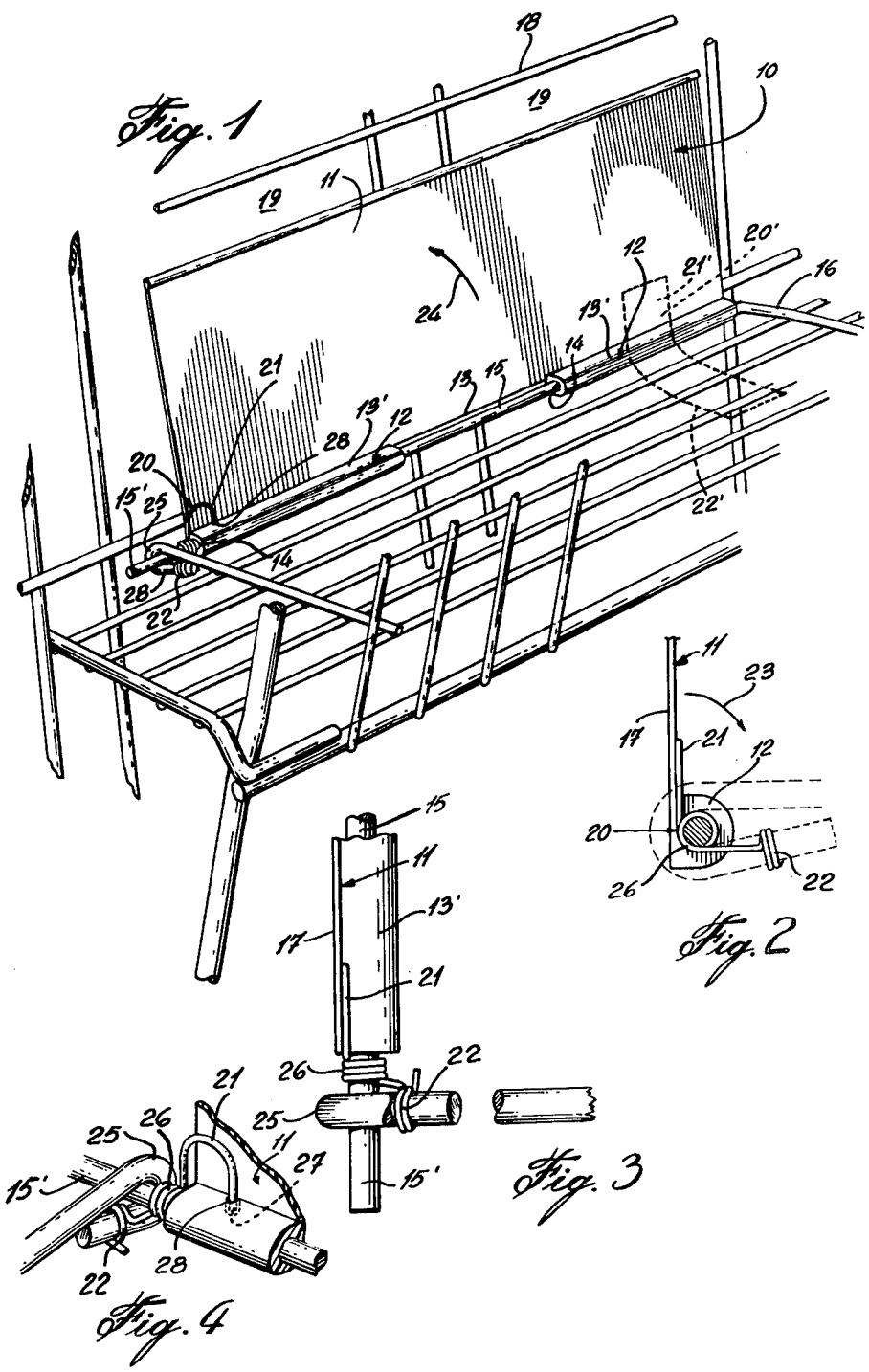

RESILIENTLY BIASED SEAT PANEL FOR A SEAT FRAME OF A PUSH-CART

BACKGROUND OF INVENTION (1) Field of the Invention

The present invention relates to an improved seat frame construction for shopping carts, or the like, and wherein a seat panel is spring-biased for displacement to and away from the seat frame to obstruct at least a substantial portion of the leg holes in an end gate of the cart.

(2) Description of Prior Art

It is customary to provide a seat panel on a seat frame which is positioned between the end gate and a back rest frame hinged to the end gate of a shopping cart. However, these seat panels are merely attached to be positioned on the seat frame whereby when a child is seated on the frame, a smooth seating surface is provided. The end gate of the shopping carts is provided with leg holes whereby a child seated on the panel extending on the seat frame can position his legs through such leg holes. Reference is made to my U.S. Pat. No. 4,125,270 issued Nov. 14, 1978 and which relates to a collapsible seat structure associated with an end gate of a nestable shopping cart and which illustrates the construction of the seat frame relative to the back rest and the end gate. When the seat frame is not utilized, the back rest frame is collapsed onto the end gate and obstruction of the leg holes is provided whereby merchandise can be placed entirely within the shopping basket of the cart.

It has been found that when people utilize these shopping carts, they usually withdraw the back rest frame whereby the seat frame is in a usable position with the seat panel lying thereover. This provides a convenient location to place small items of merchandise as the seat panel provides a solid surface. Also, the seat is elevated from the bottom wall of the large basket and it is readily accessible as it is closely spaced to the handle bar, at waist level, of the push-cart.

As a result of the use of the seat panel for the support of small products, considerable damage to merchandise has resulted for the reason that the merchandise falls through the leg holes in the rear gate and onto the floor where it is often damaged. Such damaged merchandise, if glass products or the like, can burst and cause injuries to the feet and legs of the customer utilizing the cart and it has resulted in many personal injuries. Also, it is necessary for the merchandiser to clean up the floor where the merchandise has been damaged. Thus, it can be seen that as a result of merchandise falling through the leg holes of the end gate, that injury is caused to the customer, the customer will complain to the merchandiser and ask that any personal damage be paid for and this sometimes leads to legal action taken against the merchandiser by the customer, the customer may no longer buy from the merchandiser, and in addition, labor time is used to clean up any damage caused by such breakage of merchandise and this also requires further paperwork requiring reimbursements by suppliers and recording of the accident for insurance purposes, etc. Thus, such breakage, if it can be prevented, would result in cost savings and better customer relations.

Although some seat panels are hinged and may be positioned to obstruct the leg holes, this is not realized by the user. Further, because of the manner in which the seat panels are secured, in the majority of instances the seat panel is displaced on the seat frame when the back rest frame is hinged outwardly of the end gate, and further, the smooth surface of the seat panel provides a better surface onto which merchandise can be placed. Thus, there has long existed a need to ensure that when the seat frame is used to place merchandise thereon, that the leg holes are obstructed. Heretofore, no one has provided an adequate means of fulfilling this need.

SUMMARY OF INVENTION

It is a feature of the present invention to provide a resiliently biased seat panel for a seat frame associated with an end gate of a push-cart and wherein the seat panel is biased to obstruct at least a substantial portion of the leg holes when the seat panel is not in use to support a child thereon.

A further feature of the present invention is to provide a resiliently biased seat panel which is substantially economical to produce and which is easy to use.

According to the above features, from a broad aspect, the present invention provides a resiliently biased seat panel for a seat frame associated with an end gate of a push-cart. The end gate has leg holes therein. The panel comprises hinge means to hingedly retain the panel for displacement to and away from the seat frame. Spring means biases the seat panel away from the seat frame in position against the leg holes to obstruct at least a substantial portion of the leg holes.

BRIEF DESCRIPTION OF DRAWINGS

A preferred embodiment of the present invention will now be described with reference to an example thereof as illustrated in the accompanying drawings in which:

FIG. 1 is a perspective view, partly fragmented, illustrating the resiliently biased seat panel in position relative to a seat frame and an end gate of a shopping cart;

FIG. 2 is an end view of the hinge means constituted by a wire shaped spring shown installed;

FIG. 3 is a top view of the spring of FIG. 2 shown installed; and

FIG. 4 is a fragmented perspective view showing the relationship of the spring of FIG. 2 relative to the seat panel and seat frame.

DESCRIPTION OF PREFERRED EMBODIMENTS

Referring to the drawings, and more particularly to FIG. 1, there is shown generally at 10, the resiliently biased seat panel of the present invention. As hereinshown, the panel 10 is comprised by a flat rectangular plastic plate 11 having a hinge means 12 provided on a lower edge 13 thereof. The hinge means is constituted by a bore 14 extending into an enlarged cylindrical edge portion 13' and adapted to receive a hinge rod 15 therethrough. The hinge rod 15 forms part of the seat frame 16 and has a free end 15' whereby the seat is engaged with the rod by sliding the bores 14 thereabout from the free end 15'. Thus, the seat panel is hinged to collapse onto the seat frame 16 whereby a smooth seating surface 17 is provided thereover to seat a child.

In order to seat the child on the seat panel 11, it is necessary that the end gate 18 of the shopping cart be provided with leg holes 19 wherein the legs of the child will extend therethrough and outside of the shopping basket (not shown) of the shopping cart. The seat frame is usually hinged to the end gate, although not shown herein, as it does not form part of the invention and is collapsed over the end gate when not in use.

In order that the seat panel 11 continuously obstruct at least a substantial portion of the leg holes 19, when the seat panel is not in use to seat a child thereon, the seat panel 11 is provided with spring means which biases the panel away from the seat frame 16 in position against these leg holes 19. The spring means is herein-shown as constituted by a coil spring 20 formed of a metal spring wire. Alternatively, the spring means may be constituted by a leaf spring 20' secured between the seat panel 11 and the seat frame 16, or other suitable means.

Referring now additionally to FIGS. 2, 3 and 4, the construction of the metal wire coil spring will be described. The coil spring comprises a spring biased displaceable portion 21 adjacent a first end thereof and a fixed attachable portion 22 formed in a second end portion thereof. The displaceable portion 21 is engaged by the seat panel and displaceable therewith when pressure is applied to the seating surface 17 in the direction of arrow 23 (see FIG. 4). This pressure acts against the displaceable portion 21 which exerts a restoring force in the direction of arrow 24 (see FIG. 1) to maintain the seat panel 11 in the position as shown in FIG. 1. As shown in FIG. 1, the attachable portion 22 is conveniently secured to a wire member 25 of the seat frame 16. Other convenient attachment arrangements can also be provided.

The leaf spring 20' illustrated in phantom lines in FIG. 1 is also provided with a spring biased displaceable portion 21' and an attachable portion 22'.

As shown in FIG. 2, the coil spring 20 has a helically wound portion 26 between the displaceable portion 21 and the attachable portion 22. This helically wound portion applies the restoring force mentioned above. As shown, the displaceable portion 21 is formed as a U-shaped end portion and it extends in a right-angle plane which is tangent to the circumference of the helically wound portion 26 as can be clearly seen in FIG. 4. The U-shaped portion is terminated by a free end portion 27 which is positionable in a retaining bore 28 provided on the enlarged lower edge portion 13' of the seat panel 11. Thus, the relationship of the displaceable portion 21 with respect to the seat panel 11 is illustrated in FIG. 4. Because the U-shaped end portion is constructed of flexible spring wire, the free end 27 is bendable whereby to insert it into the retaining bore 28 to permit the spring 20 and the seat to be installed independently, that is to say, the free end 27 may be inserted into the retaining bore 28 as the last step of the spring assembly.

As also shown in FIGS. 2 and 3, the attachable end portion 22 also extends tangentially from the circumference of the helically wound portion 26 transverse to the plane of the U-shaped end portion and is secured to the seat frame, as previously described. Of course, this attachable end portion 22 can be constructed differently as long as the opposed end portion of the spring 22 is immovably secured.

For the assembly of the seat 11 onto the seat frame 16, the hinge rod is displaced from the loop end 28 of the wire 25 whereby the bores 14 in the lower edge of the seat 11 can be slid thereonto. The helically wound portion 26 of the spring 20 is then positioned over the free end of the hinge rod 15 adjacent the seat 11 and the hinge rod is positioned within the loop end 28. Simultaneously, the loop fixed portion 22 of the spring is positioned about the end of the wire 25 forming the loop end 28. The U-shaped end portion 21 is then biased forwardly and bent back slightly whereby the free end 27 thereof will enter into the retaining bore 28 in the enlargements 12 in the lower edge 13. In this position, the spring biased displaceable portion 21 applies a biasing force, in the direction of arrow 24, to the panel to maintain it in position against the end gate 18 in an obstruction relationship to the leg holes 19. When the seat is to be used, a pressure is applied on the seating surface 17 in the direction of arrow 23 thus acting against the retention force of the spring biased displaceable portion 21 which is in engagement with the lower enlarged edge portion 12 of the seat 11. Thus, it can be seen that the seat 11 is continuously biased in an obstruction relationship with the leg holes 19.

It is within the ambit of the present invention to encompass obvious modifications thereof, provided such modifications fall within the scope of the broad claims appended hereto.

I claim:

1. A resiliently biased seat panel for a seat frame associated with an end gate of a push-cart, said end gate having leg holes, said panel comprising hinge means to hingedly retain said panel for displacement to and away from said seat frame, spring means biasing said seat panel away from said seat frame in position against said leg holes to obstruct at least a substantial portion of said leg holes, said spring means having a spring biased displaceable portion engaged by said seat panel and displaceable towards the plane of said seat frame when continuous pressure is applied and maintained against said displaceable portion by a sustained load on a seating surface of said seat panel and exceeding the spring restoring force of said displaceable portion, said panel automatically returning to its position against said leg holes when said sustained load is removed, an attachable portion immovably being secured with respect to said displaceable portion, said spring means being a coil spring formed of metal spring wire, said coil spring having a helically wound portion between said displaceable portion and said attachable portion, said displaceable portion being a U-shaped end portion of said metal spring wire extending in a plane tangent to the circumference of said helically wound portion, said attachable portion being formed in an opposed end portion of said metal spring wire.

2. A seat panel as claimed in claim 1, wherein said opposed end portion extnds tangentially from said circumference of said helically wound portion transverse to the plane of said U-shaped end portion and is secured to said seat frame, said helically wound portion being disposed about a hinge rod forming part of said seat frame.

3. A resiliently biased seat panel for a seat frame associated with an end gate of a push-cart, said end gate having leg holes, said panel comprising hinge means to hingedly retain said panel for displacement to and away from said seat frame, spring means biasing said seat panel away from said seat frame in position against said leg holes to obstruct at least a substantial portion of said leg holes, said spring means comprising a spring biased displaceable portion engaged by said seat panel and displaceable therewith against the spring biased force of said displaceable portion, an attachable portion being immovably secured with respect to said displaceable portion, said seat panel being a substantially flat plate, said hinge means being a hinge bore formed in a lower edge of said flat plate, a hinge rod extending through said hinge bore and secured adjacent said leg holes, said flat plate being hingedly displaced on said hinge rod, said spring means being a coil spring having a helically wound portion about said hinge rod adjacent said hinge bore, said displaceable portion having a free end engaged in a retaining bore in said lower edge of said plate under said seating surface, and said attachable portion being secured to said seat frame.

4. A seat panel as claimed in claim 3, wherein said flat plate is a rectangular plastic plate with said hinge bore molded in an edge thereof.

* * * * *